United States Patent [19]

Schmidt-Thuemmes et al.

[11] Patent Number: 5,324,772
[45] Date of Patent: Jun. 28, 1994

[54] AQUEOUS POLYMER DISPERSION

[75] Inventors: Juergen Schmidt-Thuemmes, Neuhofen; Guenter Eckert, Limburgerhof, both of Fed. Rep. of Germany

[73] Assignee: BASF Aktiengesellschaft, Ludwigshafen, Fed. Rep. of Germany

[21] Appl. No.: 983,405

[22] Filed: Nov. 30, 1992

[30] Foreign Application Priority Data

Dec. 18, 1991 [DE] Fed. Rep. of Germany ....... 4141760

[51] Int. Cl.$^5$ ...................... C08L 33/00; C14C 11/00
[52] U.S. Cl. ................................... 524/559; 524/549; 524/555; 524/560; 526/318.2; 526/318.4; 427/412
[58] Field of Search ............... 524/549, 555, 559, 560; 526/318.2, 318.4

[56] References Cited

U.S. PATENT DOCUMENTS

| | | | |
|---|---|---|---|
| 3,057,812 | 10/1962 | Straughan et al. | 526/318.2 |
| 3,980,602 | 9/1976 | Jakubauskas | 524/561 |
| 4,189,561 | 2/1980 | Burroway et al. | 526/318.4 |
| 4,492,780 | 1/1985 | Zimmerschied et al. | 524/560 |
| 4,898,909 | 2/1990 | Vietmeier et al. | 524/820 |
| 5,070,136 | 12/1991 | Dersch et al. | 524/555 |
| 5,194,483 | 3/1993 | Kawabata | 524/560 |

FOREIGN PATENT DOCUMENTS

| | | |
|---|---|---|
| 384235 | 8/1990 | European Pat. Off. . |
| 2726806 | 12/1977 | Fed. Rep. of Germany . |
| 1029318 | 5/1966 | United Kingdom . |

*Primary Examiner*—Paul R. Michl
*Assistant Examiner*—Olga Asinovsky
*Attorney, Agent, or Firm*—Oblon, Spivak, McClelland, Maier & Neustadt

[57] ABSTRACT

An aqueous polymer dispersion gives a film having high resilience in conjunction with reduced surface tack and good aging resistance under the action of light, heat and oxygen and is used for coating leather.

2 Claims, No Drawings

AQUEOUS POLYMER DISPERSION

The present invention relates to an aqueous polymer dispersion, obtainable by polymerizing a mixture A of monomers which can be subjected to free radical polymerization, consisting of a) from 65 to 99% by weight of at least one monomer mixture a which in turn consists of from 50 to 95% by weight of at least one ester selected from the group consisting of the esters of acrylic and methacrylic acid with alkanols of 1 to 8 carbon atoms, excluding 2-ethylhexyl acrylate, and from 5 to 50% by weight of 2-ethylhexyl acrylate, b) from 1 to 10% by weight of at least one monomer selected from the group consisting of $\alpha,\beta$-monoethylenically unsaturated mono- and dicarboxylic acids of 3 to 8 carbon atoms, anhydrides thereof and mono- and diamides thereof (monomer b) and c) from 0 to 25% by weight of other monomers which can be subjected to free radical copolymerization (monomer c), by the method of free radical aqueous emulsion polymerization, with the proviso that the polymerization temperature is from $\geq 0°$ to $\leq 50°$ C. and the composition of monomer mixture A is chosen so that a polymer consisting only of the monomers a and c present therein in polymerized form would have a glass transition temperature of $\leq 0°$ to $\geq -30°$ C.

The present invention furthermore relates to a process for the preparation of this dispersion and to its use as a binder, in particular for protective layers on leather.

DE-A 2 726 806 discloses aqueous polymer dispersions of polymers consisting mainly of acrylates in polymerized form, which dispersions are obtainable by the method of free radical aqueous emulsion polymerization in two stages, where the monomer composition used in the first stage would by itself lead to a polymer having a glass transition temperature below $-20°$ C. and the monomer composition used in the second stage would by itself lead to a polymer having a glass transition temperature from 60° to $-10°$ C. The aqueous polymer dispersions obtainable in this manner are recommended, inter alia, for the treatment of leather. However, the disadvantage of these polymer dispersions is that their use on leather results in protective layers which are unsatisfactory both with regard to their dry and wet breaking strength and in particular with respect to their low temperature breaking strength.

EP-A 384 235 relates to aqueous polymer dispersions which are likewise obtainable by two-stage free radical aqueous emulsion polymerization, wherein, in the first stage, at least half of a monomer mixture of butadiene and monoethylenically unsaturated compounds is prepolymerized to a conversion of 80% and, in the second stage, the polymerization is continued with the addition of the remainder of this monomer mixture and with the addition of further monoethylenically unsaturated monomers. The aqueous polymer dispersions thus obtainable are recommended as binders for protective layers on leather and have both high dry and wet breaking strength and good low temperature breaking strength. However, the disadvantage of these aqueous polymer dispersions is that protective layers produced from them exhibit unsatisfactory aging under the influence of light, oxygen and/or heat (poor fastness), which is disadvantageous in particular in the case of leathers to be used in the automotive sector.

It is an object of the present invention to remedy the disadvantages described by means of aqueous polymer dispersions which in particular are suitable as binders for protective layers on leather.

We have found that this object is achieved by the aqueous polymer dispersions defined at the outset.

Particularly suitable monomers a which are not 2-ethylhexyl acrylate are methyl acrylate, ethyl acrylate, n-butyl acrylate, isobutyl acrylate and n-butyl methacrylate, among which ethyl acrylate, n-butyl acrylate and n-butyl methacrylate are particularly preferred. Preferred monomers b are acrylic acid, methacrylic acid, itaconic acid, maleic acid, fumaric acid, acrylamide and methacrylamide, acrylic acid and acrylamide being particularly advantageous. Suitable monomers c include acrylonitrile, methacrylonitrile, vinylaromatic compounds, such as styrene, styrene derivatives having $C_1$-$C_4$-alkyl radicals on the aromatic ring, such as o-, m- and p-methylstyrene, $\alpha$-$C_1$-$C_4$-alkylstyrenes, such as e-methylstyrene, vinyl halides, such as vinyl chloride or vinylidene chloride, esters of vinyl alcohol and lower alkanecarboxylic acids, such as vinyl formate, vinyl acetate and vinyl propionate, unsaturated sulfonic acids, such as vinylsulfonic acid, or alkali metal salts thereof, as well as hydroxyalkyl acrylates and methacrylates, such as 3-hydroxypropyl acrylate, 2-hydroxyethyl acrylate, 3-hydroxypropyl methacrylate and 2-hydroxyethyl methacrylate. Particularly suitable monomers c are acrylonitrile, styrene and vinylsulfonic acid or alkali metal salts thereof, vinylsulfonic acid and its salts preferably being concomitantly polymerized in amounts of $\leq 5\%$ by weight, based on the mass of the total mixture A.

Very particularly preferred monomer mixtures A consist of from 74 to 91% by weight of ethyl acrylate, n-butyl methacrylate, n-butyl acrylate or a mixture thereof, from 5 to 22% by weight of 2-ethylhexyl acrylate, from 2 to 4% by weight of acrylamide, acrylic acid or a mixture thereof and from 0 to 1% by weight of the sodium salt of vinylsulfonic acid.

From the above mentioned range of possible monomer compositions A, A must be chosen in all cases so that a polymer consisting only of the monomers a and c present therein in polymerized form would have a glass transition temperature of from $\leq 0°$ to $\geq -30°$ C.

According to Fox (T. G. Fox, Bull. Am. Phys. Soc. (Set. II) 1 (1956), 123), the following is a good approximation of the glass transition temperature of copolymers:

$$\frac{1}{T_g} = \frac{X^1}{T_g^1} + \frac{X^2}{T_g^2} + \ldots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of each of the polymers composed only of one of the monomers $1, 2, \ldots$ or $n$, in degrees Kelvin.

The glass transition temperatures of these homopolymers of the abovementioned monomers a, c are known and are stated in, for example, J. Brandrup, E. H. Immergut, Polymer Handbook 1 st Ed. J. Wiley, New York 1966 and 2nd Ed. J. Wiley, New York 1975.

The novel aqueous polymer dispersions are prepared by polymerization of the particular monomer mixtures A, in an aqueous medium under the conventional conditions of free radical aqueous emulsion polymerization in the presence of water-soluble free radical initiators and dispersants and in the presence or absence of molecular weight regulators for the polymers, buffer substances or other conventional assistants. The emulsion polymerization can be carried out both as a batch process and as a feed process. The feed process, in which an initially taken part of the polymerization batch is heated to the polymerization temperature and the remainder, which preferably comprises the total amount of the monomer to be polymerized, is then fed in continuously while maintaining the polymerization is prefered. The monomers can be introduced in pure or emulsified form. It is preferable to feed in the monomers in aqueous emulsion.

Suitable water-soluble polymerization initiators are all those which are capable of initiating a free radical aqueous emulsion polymerization in the temperature range relevant according to the invention. These may be both peroxides, such as alkali metal or ammonium peroxydisulfate, hydrogen peroxide, tert-butyl hydroperoxide or tert-butyl perbenzoate, and azo compounds. They are used as a rule in an amount of from 0.02 to 3, preferably from 0.05 to 1.0, % by weight, based on the total amount of the monomers to be polymerized. Combined systems which are composed of at least one organic reducing agent and at least one peroxide and/or hydroperoxide are advantageously used. Examples of such reducing agents are sulfur dioxide, thiosulfate, dithionite, hydrazine sulfate, glucose, ascorbic acid and the alkali metal salts of hydroxymethanesulfinic acid. Combined systems which furthermore contain a small amount of a metal compound which is soluble in the polymerization medium and whose metallic component can occur in a plurality of valencies are very particularly preferred, for example the sodium salt of hydroxymethanesulfinic acid/iron(II) sulfate/alkali metal and/or ammonium peroxydisulfate, which represents a particularly preferred initiator system. Frequently, a combination of water-soluble Fe/V salts is also used.

Both protective colloids and emulsifiers, in particular alkali metal salts of sulfuric half-esters of saturated and unsaturated fatty alcohols ($C_{12}$ to $C_{20}$) have proven useful as dispersants. Examples of other suitable emulsifiers are the alkali metal salts of alkylsulfonic acids ($C_{12}$ to $C_{18}$), of sulfuric half-esters of ethoxylated alkylphenols (degree of ethoxylation: 3 to 30, alkyl radical: $C_8$ to $C_{10}$) and ethoxylated fatty alcohols (degree of ethoxylation: 5 to 50, alkyl radical: $C_8$ to $C_{25}$) and ethoxylated alkylphenols (degree of ethoxylation: 3 to 30, alkyl radical: $C_8$ to $C_{10}$). As a rule, from 0.2 to 3, preferably from 0.5 to 2, % by weight, based on the total amount of the monomers to be polymerized, of dispersants are used in the course of the novel free radical aqueous emulsion polymerization. After the end of the polymerization, further dispersants can, if necessary, be added in order additionally to stabilize the resulting aqueous polymer dispersion. The novel free radical aqueous emulsion polymerization is preferably carried out in the presence of dispersants which consist of at least 50% by weight of alkali metal salts of sulfuric half-esters of saturated and unsaturated fatty alcohols ($C_{12}$ to $C_{20}$). The alkali metal salts of these sulfuric half-esters are very particularly advantageously used by themselves.

The novel emulsion polymerization is preferably carried out in a polymerization medium which has a pH of from 2 to 10, preferably from 3 to 9. As a rule, the presence of buffer substances, such as tetrasodium diphosphate or compounds containing ammonium ions, proves to be advantageous in this respect.

Chain transfer agents, such as tetrabromomethane or relatively high alkyl mercaptans, such as tert-dodecyl mercaptan, may also be present in the novel polymerization. The novel polymers whose weight average molecular weight $M_w$ is usually from $3.10^5$ to $10^6$ are obtainable in this manner. The solids content of the novel aqueous polymer dispersions is of minor importance. It is advantageously from 30 to 60% by weight.

Remarkably, the films of the novel aqueous polymer dispersions have high resilience in conjunction with reduced surface tack. They are therefore particularly suitable as binders for the production of protective layers on leather, these protective layers possessing both high dry and wet flexing resistance and in particular good low temperature breaking strength. Furthermore, they have good fastness to the action of light, oxygen and/or heat. They can be used both on full-grain or buffed leather and on splits or leather fiber materials and imitation leather. They are usually used with a solids content of from 15 to 40% by weight. The novel aqueous polymer dispersions are however also suitable for the production of immersed articles, for example rubber gloves, and as binders for other conventional materials for coating, for example surface coatings or renders.

Protective layers for leather are generally applied as colored layers to meet fashion requirements. For this purpose, aqueous pigment formulations, which usually contain, as essential components, water, finely divided pigments which may be of inorganic or organic origin (for example iron oxide, titanium dioxide, azo pigments, phthalocyanines or carbon black), dispersants and, if required, thickeners, such as casein, thermoplastic or nonthermoplastic binders and further assistants, such as preservatives, are generally stirred into the polymer dispersions serving as binders.

The colored leather protective formulations thus obtainable are usually applied to leather by a pouring, knife-coating, spreading or spraying method or by means of a brush or plush pad. In general, a base protective layer is first applied, onto which a top coat of the same composition is applied after intermediate plating. After drying of the top layer is complete, suitable binder-containing seasons for imparting the desired gloss to the protective layer include nitrocellulose and other cellulose esters.

EXAMPLES

Example 1

Preparation of novel aqueous polymer dispersions Da) and Db)

Da): A mixture of 900 g of water, 20.8 g of the sodium salt of a mixture of sulfuric half-esters of saturated and unsaturated fatty alcohols ($C_{16}$ to $C_{18}$), 2.8 g of the sodium salt of hydroxymethanesulfinic acid and 1.2 g of a 1% strength by weight aqueous solution of $(NH_4)_2Fe(SO_4)_2.6H_2O$ ( Mohr's salt )

was heated to 45° C. and, beginning simultaneously, feed I was added continuously in the course of 3 hours and feed II continuously in the course of 3.5 hours. After the end of feed II, the reaction mixture was kept at 45° C. for a further hour and then cooled to 25° C.

Thereafter, 8.8 g of a 35% strength by weight aqueous solution of the sodium salt of the sulfuric half-ester of ethoxylated isooctylphenol (degree of ethoxylation: 25) and 7 g of a 10% strength by weight aqueous solution of the sodium salt of hydroxymethanesulfinic acid were added. The aqueous polymer dispersion thus obtainable had a solids content of 39.4% by weight.

Feed I:
639.1 g of water
4.8 g of tetrasodium pyrophosphate
107.2 g of the sodium salt of a mixture of sulfuric half-esters of saturated and unsaturated fatty alcohols ($C_{16}$ to $C_{18}$)
2.4 g of the sodium salt of vinyl-sulfonic acid
12 g of acrylamide
36 g of acrylic acid
1032 g of ethyl acrylate
120 g of 2-ethylhexyl acrylate Feed II:
200 g of water
2.8 g of sodium peroxydisulfate Db): As for Da), but the composition of the monomer mixture A was:
12 g of acrylamide
36 g of acrylic acid
888 g of n-butyl methacrylate
264 g of 2-ethylhexyl acrylate
2.4 g of the sodium salt of vinyl-sulfonic acid The solids content of the aqueous polymer dispersion thus obtainable was 39.2% by weight.

EXAMPLE 2

Testing Of Various Protective Layers For Leather 100 g of an aqueous commerical pigment formulation which contained, as essential components, 12% by weight of finely divided carbon black, 85% by weight of water and 2.5% by weight of a dispersant were incorporated, together with 400 g of water, into 300 g of each of the polymer dispersions Da) and Db) from Example 1, which had been brought to a solids content of 39% by weight. The formulations obtained were each sprayed in two coats (first coat 24.5 g/m² dry matter; second coat: 18.5 g/m² dry matter) onto chrome-tanned side leather. After drying in the air, plating was carried out (80° C./100 bar) and a season containing nitrocellulose as a binder (200 g of nitrocellulose in 100 g of water) was applied.

The low temperature breaking strength, the dry flex resistance (50,000 flexes with a Bally flexometer) and the wet flex resistance (25,000 flexes with a Bally flexometer) were then determined for the resulting protective layers for leather, by the methods of the International Union of Leather Chemists Association (I. U. P. methods). The low temperature breaking strength was determined as follows: a test specimen of coated leather (7 cm x 4.5 cm) was flexed 10,000 times in a refrigerator at −20° C. using a Bally flexometer. The flexing folds were then checked for breakage using a magnifying glass (8 times magnification).

The results are shown in the Table in the form of ratings on a scale from 1 (very good) to 6 (poor).

The Table also provides information about the hot-light aging of the leather coatings which were tested according to DIN 75,202, the evaluation being carried out according to the Wollblau scale (DIN 54,001). An increasing value in the evaluation corresponds here to an increase in the fastness to hot light. The Table also shows the results of three Comparative Experiments in which the binders used were aqueous polymer dispersions diluted to a solids content of 39% by weight, according to Example 1 of DE-A 27 26 806 (DVa)), according to Example 1/B1 of EP-A-384 235 (DVb)) or according to Da) from Example 1, but polymerized at 65° C. instead of 45° C. (DVc)).

TABLE

|  | Da) | Db) | DVa) | DVb) | DVc) |
|---|---|---|---|---|---|
| Dry flex resistance | 1 | 1 | 6 | 1 | 6 |
| Wet flex resistance | 2 | 2 | 6 | 1 | 2 |
| Low temperature breaking strength | 1 | 1 | 6 | 1 | 3 |
| Hot light fastness | 6–7 | 6–7 | 6–7 | 1–2* | 6–7 |

*The binder used here already contained 0.5% by weight, based on the solids content, of the commercial agent Wingstay ® L from Goodyear, which improves the hot light fastness.

We claim:

1. A method for forming a protective coat on an article, comprising coating said article with an aqueous polymer dispersion, obtainable by polymerizing a mixture A of monomers, which can be subjected to free radical polymerization, consisting of:
   (a) from 65 to 99% by weight of at least one monomer mixture a which consists of:
      ($a_1$) from 50 to 95% by weight of at least one ester selected from the group consisting of the esters of acrylic and methacrylic acid of alkanols of 1 to 8 carbon atoms, excluding 2-ethylhexyl acrylate; and
      ($a_2$) from 5 to 50% by weight of 2-ethylhexyl acrylate;
   (b) from 1 to 10% by weight of at least one monomer selected from the group consisting of α,β-monoethylenically unsaturated mono- and dicarboxylic acids of 3 to 8 carbon atoms, anhydrides thereof and mono- and diamides thereof; and
   (c) from 0 to 25% by weight of other monomers which can be subjected to free radical copolymerization; by the method of free radical aqueous emulsion polymerization, with the proviso that the polymerization temperature is from ≧0 to ≦50° C. and the composition of monomer mixture A is chosen so that a polymer consisting only of the monomers (a) and (c) present therein in polymerized form would have a glass transition temperature of ≦0 to ≧−30° C., wherein said article is leather.

2. A coated article prepared by a process, comprising coating an article with an aqueous polymer dispersion, obtainable by polymerizing a mixture A of monomers, which can be subjected to free radical polymerization, consisting of:
   (a) from 65 to 99% by weight of at least one monomer mixture a which consists of:
      ($a_1$) from 50 to 95% by weight of at least one ester selected from the group consisting of the esters of acrylic and methacrylic acid of alkanols of 1 to 8 carbon atoms, excluding 2-ethylhexyl acrylate; and
      ($a_2$) from 5 to 50% by weight of 2-ethylhexyl acrylate;
   (b) from 1 to 10% by weight of at least one monomer selected from the group consisting of α,β-monoethylenically unsaturated mono- and dicarboxylic acids of 3 to 8 carbon atoms, anhydrides thereof and mono- and diamides thereof; and (c) from 0 to 25% by weight of other monomers which can be subjected to free radical copolymerization;

by the method of free radical aqueous emulsion polymerization, with the proviso that the polymerization temperature is from $\geq 0$ to $\leq 50°$ C. and the composition of monomer mixture A is chosen so that a polymer consisting only of the monomers (a) and (c) present therein in polymerized form would have a glass transition temperature of $\leq 0$ to $\geq -30°$ C., wherein said article is leather.

* * * * *